United States Patent
Liang

(10) Patent No.: US 8,670,072 B1
(45) Date of Patent: Mar. 11, 2014

(54) METHOD AND APPARATUS FOR STREAMING MEDIA DATA PROCESSING, AND STREAMING MEDIA PLAYBACK EQUIPMENT

(71) Applicant: Guangzhou UCWeb Computer Technology Co., Ltd, Guangzhou (CN)

(72) Inventor: Jie Liang, Guangzhou (CN)

(73) Assignee: Guangzhou UCWeb Computer Technology Co., Ltd, Guangzhou (CN)

(*) Notice: Subject to any disclaimer, the term of this patent is extended or adjusted under 35 U.S.C. 154(b) by 0 days.

(21) Appl. No.: 13/977,017

(22) PCT Filed: Sep. 21, 2012

(86) PCT No.: PCT/CN2012/081769
§ 371 (c)(1),
(2), (4) Date: Jun. 28, 2013

(87) PCT Pub. No.: WO2013/082965
PCT Pub. Date: Jun. 13, 2013

(30) Foreign Application Priority Data

Dec. 5, 2011 (CN) .......................... 2011 1 0400172

(51) Int. Cl.
*H04N 9/475* (2006.01)
*H04N 21/2368* (2011.01)
*H04N 21/434* (2011.01)
*H04N 21/43* (2011.01)

(52) U.S. Cl.
CPC ....... *H04N 21/2368* (2013.01); *H04N 21/4341* (2013.01); *H04N 21/4307* (2013.01)
USPC .......................................... 348/515; 348/512

(58) Field of Classification Search
CPC . H04N 21/4341; H04N 5/04; H04N 21/2368; H04N 21/4305; H04N 21/242; H04N 21/4307; H04N 7/50; H04N 21/4347; H04N 21/2365

USPC .............................. 348/515, 512; 375/240.28
IPC ........................................................ H04N 9/475
See application file for complete search history.

(56) References Cited

U.S. PATENT DOCUMENTS

2007/0268404 A1* 11/2007 Maertens et al. ............. 348/515

FOREIGN PATENT DOCUMENTS

| CN | 1767601 A | 5/2006 |
|---|---|---|
| CN | 1917652 A | 2/2007 |
| CN | 101127917 A | 2/2008 |

*Primary Examiner* — Sherrie Hsia
(74) *Attorney, Agent, or Firm* — Anova Law Group, PLLC

(57) ABSTRACT

The present invention provides a streaming media data processing method. The method includes: based on a stream index in streaming media data, separating the streaming media data stream into audio stream data and video stream data and respectively buffering them in an audio stream data queue and a video stream data queue; respectively decoding audio data buffered in the audio stream data queue and video data buffered in the video stream data queue; based on a play callback timestamp of the decoded audio data and a system time of a streaming media playback equipment, determining an audio/video synchronization time; based on a comparison result between a video frame timestamp and a sum of the determined audio/video synchronization time and a video refresh time, processing and displaying each frame in the decoded video stream data according to a predetermined processing method in accordance with the comparison result. The method may avoid the asynchrony between video and audio steams resulted from the asynchrony between audio time and the system time and, at the same time, the synchronization between the video time and the system time when displaying the stream data, which may greatly reduce the repeated video pauses in the video display.

17 Claims, 3 Drawing Sheets

STREAMING MEDIA
PLAYBACK EQUIPMENT 10

STREAMING MEDIA DATA
PROCESSING APPARATUS 200

FIG. 3

MOBILE TERMINAL 20

STREAMING MEDIA DATA
PROCESSING APPARATUS 200

FIG. 4

METHOD AND APPARATUS FOR STREAMING MEDIA DATA PROCESSING, AND STREAMING MEDIA PLAYBACK EQUIPMENT

TECHNOLOGY FIELD

The present invention relates to the field of mobile communications and, more particularly, to a method and an apparatus for streaming media data processing, and a streaming media playback equipment containing the streaming media data processing apparatus.

BACKGROUND

Streaming media applications currently become increasingly popular. Streaming media is a media format used to play multimedia on the Internet in a stream transmission mode. Streaming media is also called stream media, which means the business owners transmit programs as data packets to the network through a video transmitting server. After those multimedia data are decoded by the network users via a decoding apparatus, the multimedia programs can be displayed in the same way in which they were displayed before they were sent.

Generally, streaming media data include audio data and video data. Audio data and video data are two independent data streams. To display the streaming media data, audio data and video data need to be separated, and then decoded and presented respectively. When decoding and presenting audio data and video data, each frame of both audio data and video data has a specific decoding time frame and a display timestamp. However, due to the untimely play callback (e.g., sound card callback) in the audio output device (e.g., sound card) of the playback system, the uneven time for decoding audio frames and video frames, and the repeated video pauses caused by a long decoding time of I frame, users may have poor experience for viewing stream data. The callback (e.g., sound card callback) means that the audio output device (e.g., sound card) is configured to callback at given intervals for indicating that a small portion of audio data has been played. At this time, the timestamp is also referred to as a callback timestamp.

SUMMARY OF THE INVENTION

Therefore, the present invention provides a streaming media data processing method. In this method, the play callback timestamp of the decoded video data is used to update the system time of the streaming media data processing equipment, and the method for processing video frame is determined based on the updated system time after audio data and the video data are decoded. The method may avoid the asynchrony between video and audio steams at playback time resulted from the asynchrony between audio time and the system time and, at the same time, the synchronization between the video time and the system time, which may greatly reduce the repeated video pauses in the video display. Further, the audio and video synchronization is preformed after decoding is performed, which may avoid black screen when a severe video pause occurs during video display.

According to one aspect of the present invention, a streaming media data processing method is provided. The method includes: based on a stream index in the streaming media data, separating the streaming media data stream into audio stream data and video stream data and respectively buffering them in an audio stream data queue and a video stream data queue; respectively decoding audio data buffered in the audio stream data queue and video data buffered in the video stream data queue; based on a play callback timestamp of the decoded audio data and a system time of the streaming media playback equipment, determining an audio/video synchronization time; based on a comparison result between a video frame timestamp and a sum of the determined audio/video synchronization time and a video refresh time, processing and displaying each frame in the decoded video stream data according to a predetermined processing method in accordance with the comparison result.

Further, in one or more embodiments of the above aspects, the video frame is decoded when the video frame is determined to be a key data frame or the video frame timestamp is larger than or equal to the sum of the determined audio/video synchronization time and the decoding time of the video frame. In addition, the video frame is discarded when the video frame is determined not to be a key data frame or the video frame timestamp is less than the sum of the determined audio/video synchronization time and the decoding time of the video frame.

Further, in one or more embodiments of the above aspects, when the play callback timestamp of the decoded audio data is inconsistent with the system time of the streaming media playback equipment, the audio/video synchronization time is determined to be half of the sum of the callback timestamp and the system time of the streaming media playback apparatus.

Further, in one or more embodiments of the above aspects, the video frame waits to be displayed when the video frame timestamp is greater than the sum of the determined audio/video synchronization time and the video refresh time; the video frame is displayed when the video frame timestamp is equal to the sum of the determined audio/video synchronization time and the video refresh time; or the video frame is discarded when the video frame timestamp is less than the sum of the determined audio/video synchronization time and the video refresh time.

Further, in one or more embodiments of the above aspects, before the audio frame is played, whether the data buffer queue in the audio playing module is fully filled with audio stream data is determined. If the data buffer queue in the audio playing module is fully filled with audio stream data or all audio data is completely decoded, the audio stream data is played. Otherwise, the audio stream data in the audio stream data buffer queue is decoded continuously.

Further, in one or more embodiments of the above aspects, when the video frame is displayed, a pointer redirecting technique is used to perform a reference operation directly on the memory storing the video frames.

According to another aspect of the present invention, a streaming media data processing apparatus is provided. The apparatus includes: a data separating unit configured to separate the streaming media into data audio stream data and video stream data based on the stream index in the streaming media data; a buffering unit configured to respectively buffer the separated audio and video stream data in an audio stream data queue and a video stream data queue; an audio data decoding unit configured to decode the audio data buffered in the audio stream data queue; a video data decoding unit configured to decode the video stream data buffered in the video stream data queue; an audio/video synchronization time determining unit configured to determine the audio/video synchronization time, based on a play callback timestamp of the decoded audio data and a system time of the streaming media playback apparatus; a video frame processing unit configured to, based on the comparison result between a video frame timestamp and a sum of the determined audio/video synchronization time and a video refresh time, process and display each frame of the decoded video stream data according to a predetermined processing method in accordance with the comparison result.

Further, in one or more embodiments of the above aspects, when the play callback timestamp of the decoded audio data is inconsistent with the system time of the streaming media playback apparatus, an updating unit determines that the audio/video synchronization time is half of the sum of the callback timestamp and the system time of the streaming media playback apparatus.

Further, in one or more embodiments of the above aspects, the streaming media data processing device further includes: a time determining unit configured to determine whether the video frame is a key data frame or whether the video frame timestamp is larger than or equal to the sum of the determined audio/video synchronization time and decoding time of the video frame. When the video frame is a key data frame or the video frame timestamp is larger than or equal to the sum of the determined audio/video synchronization time and decoding time of the video frame, the video data decoding unit decodes the video frame. When the video frame is not a key data frame or the video frame timestamp is less than the sum of the determined audio/video synchronization time and decoding time of the video frame, the video frame processing unit discards the video frame.

Further, in one or more embodiments of the above aspects, when the video frame timestamp is greater than the sum of the determined audio/video synchronization time and the video refresh time, the video frame processing unit waits for displaying the video frame data; when the video frame time stamp is equal to the sum of the determined audio/video synchronization time and the video refresh time, the video frame processing unit displays the video frame; when the video frame time stamp is less than the sum of the determined audio/video synchronization time and of the video refresh time, the video frame processing unit discards the video frame.

Further, in one or more embodiments of the above aspects, the streaming media data processing apparatus may further include an audio stream data display determining unit configured to determine whether the data buffer queue in the audio playing module is fully filled with the audio stream data before playing the audio stream data. Thus, when the data buffer queue in the audio playing module is fully filled with the audio stream data or all audio data is completely decoded, the audio playing module plays the audio steaming data. Otherwise, the audio stream data decoding unit continuously decodes the audio stream data buffered in the audio stream data queue.

Further, in one or more embodiments of the above aspects, the streaming media data processing apparatus may further include a memory reference unit configured to use the pointer redirecting technique to perform a reference operation directly on the memory storing the video frames.

According to another aspect of the present invention, a streaming media playback equipment is provided and includes a streaming media data processing apparatus.

In order to achieve the above and other related objectives, one or more aspects of the present invention include those features to be described in detail as follows and particularly pointed out in the claims. The following descriptions and accompanying drawings describe in detail certain illustrative aspects of the present invention. However, these aspects only illustrate some of the ways in which the principle of the present invention may be used. In addition, the present invention intends to include all these aspects and their equivalents.

BRIEF DESCRIPTION OF THE DRAWINGS

By referring to the detailed descriptions of the accompanying drawings, the above and other objectives, features and advantages of the present invention will be clear and easily understood. In the drawings:

FIG. 3 shows a streaming media data playback equipment with the streaming media data processing apparatus of the present invention; and FIG. 4 shows a mobile terminal with the streaming media data processing apparatus in accordance with the present invention.

The same label may be used in all drawings to indicate similar or corresponding features or functions.

DETAILED DESCRIPTIONS

Various aspects of the present disclosure are described more fully hereinafter. It should be understood that the present disclosure herein may be embodied in many different forms, and any specific structures or functions or both presented throughout this disclosure are only representative. Based on the teachings herein, those skilled in the art should understand that any aspect of the present disclosure may be implemented independently of any other aspect of the disclosure and combined with any two or more aspects of the disclosure in various ways. For example, an apparatus may be implemented or a method may be practiced using any number of the aspects set forth herein. In addition, the scope of the disclosure is intended to cover such an apparatus or method which is implemented using other structure, functionality, or structure and functionality besides or other than one or more aspects of the present disclosure. Further, it should be understood that any aspect of the disclosure disclosed herein may be embodied by one or more elements of claims.

Various embodiments are described hereinafter with reference to the accompanying drawings.

Figure 1:
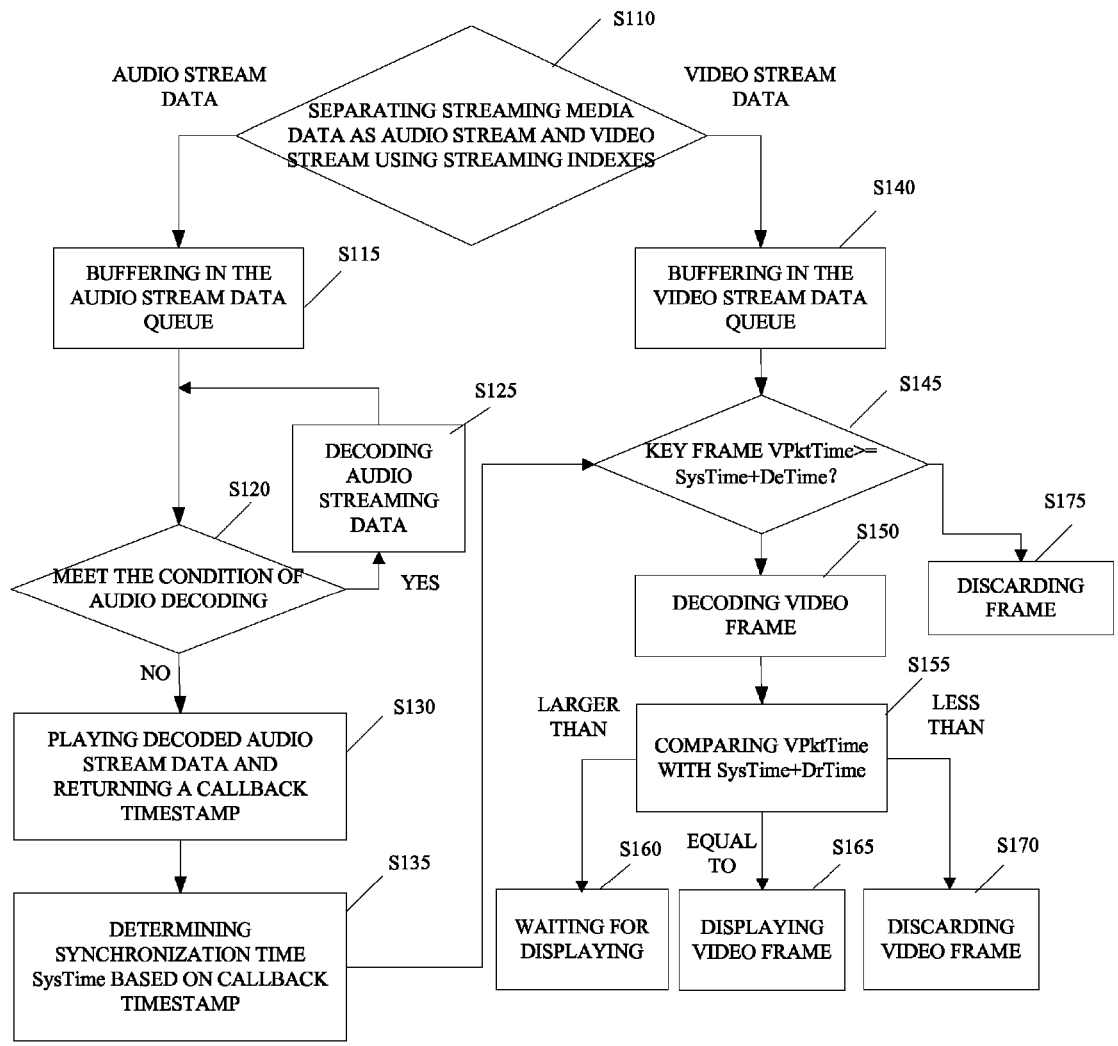
FIG. 1 shows a flowchart of a streaming media data processing method according to one embodiment of the present invention.

FIG. 1 shows a flowchart of a streaming media data processing method according to one embodiment of the present invention.

According to one embodiment of the present invention, when displaying and processing the streaming media data, as shown in FIG. 1, first, in Step S110, based on the stream index in the streaming media data (e.g., stream index in a streaming media data packet), the streaming media data to be played back are separated into audio stream data and video stream data, where the stream index is used for indicating the type of streaming data, such as audio or video stream data. Then, the separated audio stream data is buffered in the audio stream data queue (Step S115), and the separated video stream data is buffered in the video stream data queue (Step S140).

Then, in Step S120, it is determined whether the audio stream data buffered in the audio stream data queue meets the condition of decoding audio data. For example, the condition of decoding audio data may include whether the buffered data queue of an audio playing module is fully filled with audio stream data. For example, the audio playing module may be a sound card. The size of sound card data buffer queue may be equal to video frame rate. In this case, before playing the audio stream data, it is determined whether sound card data buffer queue has been fully filled with audio steaming data (that is, 1 s audio data).

If sound card data buffer queue is not fully filled, it is considered that the condition of decoding audio data is met. Otherwise, it is considered that the condition of decoding audio data is not met. That is, when the condition of decoding audio data is met (for example, when sound data buffer queue is not fully filled), i.e., the decision in step S120 is YES, the process continues to Step S125.

In Step S125, the audio stream data is decoded and PCM (Pulse Code Modulation) data stream is outputted, and then the process returns to Step S120 to continue waiting, until the condition of decoding audio data is not met. In this perspective, if there is a callback, it means the audio data has been played, which further means the data of the audio data buffer queue in the audio playing module has been consumed. Thus, it indicates that the buffer queue is not fully filled and decoding audio data can be performed. From this point of view, the existence of callback indicates that the audio data decoding can be performed. Here, the main purpose of Step 120 is to repartition the decoded audio stream data based on the frame rate. This method may make the callback (e.g., sound card callback) being returned more evenly.

If the decision in Step 120 is NO, that is, the condition of decoding audio data is not met, Step S130 may be performed. In Step S130, the decoded audio stream data of the data buffer queue in the audio playing module is played back through the audio playing module in the streaming media playback equipment and the callback timestamp is returned. For example, the audio playing module may be sound card equipment.

Then, in Step S135, the audio/video synchronization time SysTime may be determined based on the returned callback timestamp and the system time of the streaming media playback equipment. For example, in one embodiment of the present invention, the callback timestamp may be compared with the system time of the streaming media playback equipment. If the callback timestamp is consistent with the system time of the streaming media playback equipment, the audio/video synchronization time SysTime may be determined to be the system time of streaming media playback equipment.

However, when the callback timestamp is inconsistent with the system time of the streaming media playback equipment, the audio/video synchronization time SysTime may be determined to be half of the sum of the system time and the callback timestamp. Obviously, the example described above is only one embodiment of the present invention. Other functions with parameters including the callback timestamp and the system time of streaming media playback equipment may also be used to determine how to calculate the audio/video synchronization time SysTime based on the callback timestamp and the system time of the streaming media playback equipment.

After the audio/video synchronization time is determined, in Step S145, it is determined whether each video frame buffered in the video stream data queue is a key data frame or whether the timestamp of video frame VPktTime is greater than or equal to the sum of the determined SysTime and the video frame decoding time DeTime. As used herein, a key video frame is referred to be a video I frame, which contains the complete video frame information that may be referenced by the video P-frame or the video B-frame. If the video I frame is lost, after the video P-frame or video B-frame, depending on the video I frame, is decoded, the mosaic phenomena may occur to both frames, causing poor quality of the displayed image. This may make it hard for users to perceive the whole image. The video frame decoding time DeTime is the time used for successfully decoding the video frame.

If the video frame is a key data frame or the video frame timestamp is greater than or equal to the sum of the determined audio/video synchronization time and the video frame decoding time, the video frame may be decoded in Step S150. On the other hand, if the video frame is not a key data frame or the video frame timestamp is less than the sum of the determined audio/video synchronization time and the video frame decoding time, the video frame may be discarded in Step S175.

After the video frame is decoded, in Step S155, the video frame timestamp VpktTime may be compared with the sum of the determined audio/video synchronization time SysTime and the video refresh time DrTime, wherein the video refresh time DrTime is the time used for performing a refresh operation.

When the video frame timestamp is greater than the sum of the determined audio/video synchronization time and the video refresh time, the video frame processing unit waits for displaying the video frame. When the video frame timestamp is equal to the sum of the determined audio/video synchronization time and the video refresh time, the video frame processing unit displays the video frame. Or, when the video frame timestamp is less than the sum of the determined audio/video synchronization time and the video refresh time, the video frame processing unit discards the video frame. At this point, the video frame processing is completely performed. Upon completion of the processing operations of the video frame, the process returns to Step S145 and the next video frame is processed in a similar way until the end of the playback.

In the method according to the present invention, by using the play callback timestamp of the decoded audio data to update the system time of the streaming media data processing apparatus, it may avoid the asynchrony between audio data and video data resulted from the inconsistency between the audio timestamp and the system time and, at the same time, the synchronization between the video timestamp and the system time. Therefore, the repeated video pauses occurring while users watch video may be greatly reduced.

In addition, the display processing method for the video frame is determined based on the updated system time after the audio data and video data are decoded, which may avoid black screen when a severe repeated video pause occurs in the video display.

In addition, before decoding the audio stream data, it is determined whether the audio decoding condition is met. For example, before playing back audio data, it is determined whether the data buffer queue in the audio playing module has been fully filled with the audio steaming data. If the data buffer queue in the audio playing module is not fully filled, it is considered that the audio decoding condition is met so that the audio stream data may be decoded. Otherwise, it is considered that the audio decoding condition is not met so that the audio playing device may be allowed to play audio data. The size of the data buffer queue in the audio playing module is equal to the frame rate. By using this method, the decoded audio stream data may be repartitioned based on the frame rate and to make the callback (e.g., sound card callback) being returned more evenly.

Further, in the above embodiment, before the video data is decoded, the video frame timestamp may be compared with the sum of the audio/video synchronization time and the video frame decoding time. The video frame may be discarded if it is delayed, which may avoid the decoding operation for such an unsynchronized video frame and may further reduce the amount and time of data processing.

The streaming media data processing method according to the present invention has been described above with reference to FIG. 1. Those skilled in the art should understand that the above are only examples, and they may make various modifications of the above-described embodiments without departing from the scope of the present invention.

For example, in another embodiment of the present invention, the determination procedure in Step S145 of FIG. 1 about whether to decode the video frame may be omitted. That is, in this embodiment, all data buffered in the video stream data queue may be decoded, and the processing and displaying determination procedure for each decoded frame may be performed based on the determined audio/video synchronization time.

Further, in another embodiment of the present invention, the audio decoding determination procedure in Step S120 may also be omitted.

Further, in another embodiment of the present invention, when the video frame is displayed, a pointer redirecting technique may be used to perform a reference operation directly on a memory storing the video frames. Generally, a memory in the decoder may be assigned to store the decoded video data (e.g., YUV data) after the decoding process is completed and then the decoded video data may be copied, extracted from the memory and displayed. In the embodiment, the pointer redirecting technique may be used to perform reference operation on the memory storing the decoded data, such that it is not necessary to perform YUV video data queue buffering after decoding the video data, which may further avoid a video memory copy operation.

The streaming media data processing method according to the present invention has been described above with reference to FIG. 1. The above-described streaming media data processing method may be implemented using software, or hardware, or a combination of software and hardware.

Figure 2:
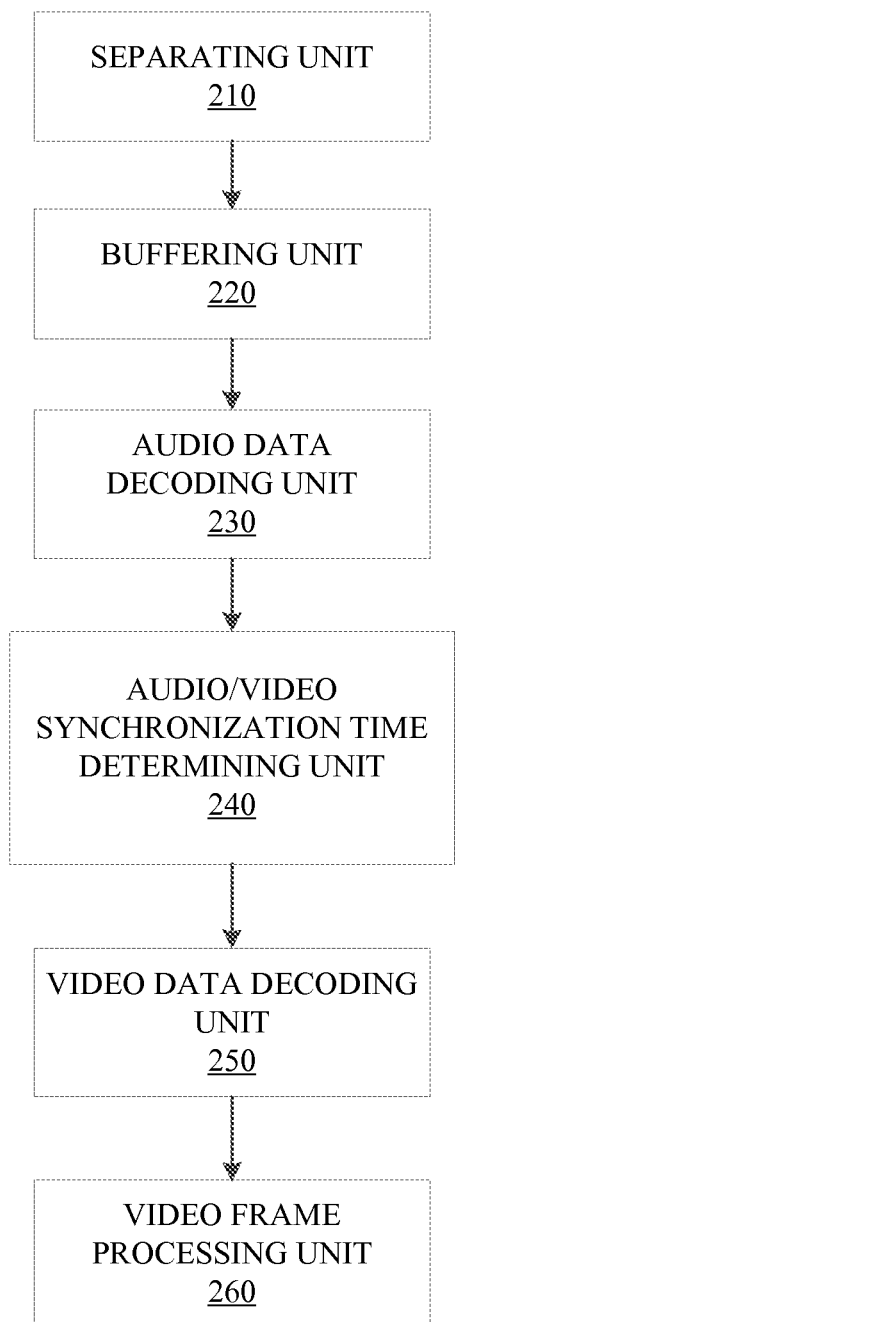
FIG. 2 shows a block diagram of a streaming media data processing apparatus according to one embodiment of the present invention.

FIG. 2 shows a block diagram of a streaming media data processing apparatus 200 according to one embodiment of the present invention.

As shown in FIG. 2, the streaming media data processing apparatus 200 includes a data separating unit 210, a buffering unit 220, an audio data decoding unit 230, an audio/video synchronization time determining unit 240, a video data decoding unit 250 and a video frame processing unit 260.

The data separating unit 210 is configured to separate the streaming media data into audio stream data and video stream data according to the stream index in the streaming media data. Then, the buffer unit 220 is configured to respectively buffer the separated audio and video stream data in an audio stream data queue and a video stream data queue.

The audio data decoding unit 230 is configured to decode the audio data buffered in the audio stream data queue. The video data decoding unit 250 is configured to decode the video stream data buffered in the video stream data queue.

The audio stream data decoded by the audio data decoding unit 230 may be transmitted to and played by an audio playback module in the streaming media data playback apparatus and then a callback timestamp may be returned from the audio playback module. Upon receiving the callback timestamp, the audio/video synchronization time determining unit 240 will determine the audio/video synchronization time based on the callback timestamp of the decoded audio data and the system time of the streaming media playback apparatus. For example, in one or more examples of the above embodiments, when the play callback timestamp of the decoded audio data is inconsistent with the system time of the streaming media playback apparatus, the audio/video synchronization time determining unit 240 may determine that audio/video synchronization time SysTime is half of the sum of the callback timestamp and the system time. When the play callback timestamp is consistent with the system time of streaming media playback apparatus, the audio/video synchronization time determining unit 240 determines that audio/video synchronization time SysTime is equal to the system time of the streaming media data playback apparatus.

After the audio/video synchronization time is determined, for each frame in the decoded video stream data, the video frame processing unit 260 may process the video frame according to the predetermined processing method based on the comparison result between the video frame timestamp and the sum of the determined audio/video synchronization time and the video refresh time. For example, in one or more embodiments of the present invention, the predetermined processing method includes: when the video frame timestamp is greater than the sum of determined audio/video synchronization time and the video refresh time, the video frame processing unit 260 may wait for displaying the video frame; when the video frame timestamp is equal to the sum of determined audio/video synchronization time and the video refresh time, the video frame processing unit 260 may display the video frame; when the video frame timestamp is less than the sum of the determined audio/video synchronization time and the video refresh time, the video frame processing unit 260 may discard the video frame. Obviously, the predetermined processing method may be modified according to specific circumstances.

Further, in one or more examples of the above embodiments, the streaming media data processing apparatus may further include a time determining unit (not shown) configured to determine whether the video frame is a key data frame or whether the video frame timestamp is larger than or equal to the sum of the determined audio/video synchronization time and the decoding time of the video frame. If the video frame is a key data frame or the video frame timestamp is larger than or equal to the sum of the determined audio/video synchronization time and the decoding time of the video frame, the video data decoding unit may decode the video frame. If the video frame is not a key data frame or the video frame timestamp is less than the sum of the determined audio/video synchronization time and the decoding time of the video frame, the video data decoding unit may discard the video frame.

Further, in one or more examples of the above embodiments, the streaming media data processing apparatus may further include an audio stream data playing determining unit (not shown) configured to determine whether the data buffer queue in the audio playing module has been fully filled with audio steam data. If the data buffer queue in the audio playing module has been fully filled with audio steam data, the audio playing module may play the audio stream data. Otherwise, the audio data decoding unit may continuously decode the audio stream data.

Further, in one or more examples of the above embodiments, the streaming media data processing apparatus may further include a memory reference unit (not shown) configured to use a pointer redirecting technique to perform a reference operation directly on the memory storing the decoded data when the decoded video data is displayed.

FIG. 3 shows a streaming media data playback equipment 10 having the streaming media data processing apparatus 200 of the present invention. The streaming media data playback equipment may be a mobile terminal FIG. 4 shows a mobile terminal having the stream streaming media data processing apparatus 200 in accordance with the present invention. Further, in one embodiment of the present invention, the streaming media data processing apparatus may also be within a mobile terminal browser.

Further, typically, the mobile terminal in the present invention may include a variety of handheld devices, such as mobile phones, personal digital assistant (PDA), etc., and the scope of the legal protection given to the invention should not be limited to any specific type of mobile terminal.

In addition, the method of the present invention can also be realized in computer programs executed by a CPU. When the computer programs are executed by the CPU, the above described functionalities defined in the method of the present invention can be performed.

Further, the above method steps and system units can be realized by a controller (e.g., a processor) and a computer-readable storage medium storing computer programs capable of making the controller or processor to realize the above method steps or system units.

In accordance with one embodiment of the present invention, updating the system time of the streaming media data processing apparatus by using the play callback timestamp of the decoded audio data, may avoid the asynchrony between audio data and video data resulted from inconsistency between the audio timestamp and the system time and, at the same time, the synchronization between the audio timestamp and the system time. Thus, the repeated video pauses may be greatly reduced when users watch video.

Further, in accordance with one embodiment of the present invention, the method for processing and displaying video frame is determined based on the updated system time after the audio data and video data are decoded, which may avoid black screen display when severe repeated video pauses occur in the video display.

Further, in accordance with one embodiment of the present invention, before the video data is decoded, a determination is made by comparing the video frame timestamp with the sum of the audio/video synchronization time and the video frame decoding time. The video frame can be discarded if it is delayed, which may avoid decoding unsynchronized video frames and may reduce the amount and time of data processing.

Further, in accordance with another embodiment of the present invention, after the audio stream data is decoded, the decoded audio stream data may be repartitioned based on the frame rate. This method may make the callback (e.g., sound card callback) being returned more evenly.

Further, in another embodiment of the present invention, when the video frame data is displayed, the pointer redirecting technique may be used to perform a reference operation directly on the memory storing the video frames. This method allows performing the reference operation on the memory storing the decoded data such that it is unnecessary to perform YUV video queue buffering again after decoding the video frame. Thus, a video memory copy operation may be avoided.

In addition, it should be clear that the described computer-readable storage media (e.g., memory) may be volatile memory or non-volatile memory, or may include volatile memory and nonvolatile memory. As a non-limiting example, nonvolatile memory can include read-only memory (ROM), programmable ROM (PROM), erasable programmable ROM (EPROM), electrically erasable programmable ROM (EEPROM), or flash memory. Volatile memory may include random-access memory (RAM) and the RAM may be used as external cache memory. As a non-limiting example, RAM can be produced in various forms such as synchronous RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). It is intended that the disclosed storage media include but not limited to these and other suitable types of memory.

Those skilled in the art will understand that the disclosed various exemplary logic blocks, modules, circuits and algorithm steps can be implemented in electronic hardware, computer software or a combination thereof. In order to clearly illustrate the interchangeability between the hardware and the software, the functions of the various exemplary components, blocks, modules, circuits and algorithm steps have been generally described. Whether the functions are implemented in hardware or software depends on the specific application and the design limitation imposed on the entire system. Those skilled in the art can use a variety of ways to realize the described functionalities for each specific application. However, such realization decision should not be interpreted as departing from the scope of the present invention.

The various illustrative logic blocks, modules, and circuits described herein can be designed using the following components performing the disclosed functionalities: general-purpose processor, digital signal processor (DSP), application specific integrated circuits (ASICs), field programmable gate array (FPGA) or other programmable logic device, discrete gate or transistor logic, discrete hardware components, or any combination of these components. The general-purpose processor can be a microprocessor or, alternatively, the processor can be any conventional processor, controller, microcontroller or state machine. The processor can also be a combination of computing devices, such as a combination of DSP and microprocessors, multiple microprocessors, one or more microprocessors integrated with a DSP core, or any other such configurations.

The disclosed methods or algorithm steps may be embodied in hardware directly, in software modules executed by the processor, or any combination thereof. The software modules can reside in RAM memory, flash memory, ROM memory, EPROM memory, EEPROM memory, registers, hard disk, removable disk, the CD-ROM, or any other form of storage medium known in the field. The storage medium can be coupled to the processor, such that the processor can read information from the storage medium and write information to the storage medium. Alternatively, the storage medium can be integrated with the processor. The processor and the storage medium may reside in an ASIC. The ASIC can reside in the user terminal. Also alternatively, the processor and the storage medium may reside as discrete components in the user terminal.

In one or more exemplary designs, the above described functionalities can be implemented in hardware, software, firmware, or any combination thereof. If implemented in software, the functionalities can be treated as one or more instructions or codes and stored in or transmitted over a computer-readable media. Computer-readable media include both computer storage media and communication media including any media which facilitates the transfer of a computer program from one location to another location. A storage medium can be any available medium that can be accessed by a general purpose or a special purpose computer. For example and without limitation, such computer-readable media can include RAM, ROM, EEPROM, CD-ROM or other optical storage devices, magnetic disk storage or other magnetic storage devices, or any other media used to carry or store desired program codes in the form of instructions or data structures that can be accessed by the general or special purpose computers and general or special purpose processors.

In addition, any connection can be properly termed as a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Magnetic and optical disks, as used herein, include compact disk (CD), laser disc, optical disc, digital versatile disc (DVD), floppy disk, blue-ray disc, wherein disks usually reproduce data magnetically and optical discs reproduce data optically with laser. Combinations of the above should also be included within the scope of computer-readable media.

Although the above disclosure illustrates exemplary embodiments of the present invention, it should be noted, however, various changes and modifications may be made without departing from the scope of the present invention defined in the claims. According to the methods illustrated in the embodiments of the present invention, the functions, steps and/or actions in the claim are not required to be executed in a particular order. In addition, although the elements of the present invention may be described or requested individually, they may also be assumed to be plural, unless they are clearly limited to a single number.

Although the present invention has been disclosed together with the preferred embodiments which is shown and described in detail, those skilled in the art should understand that various improvements can be made to the above described embodiments, without departing from the contents of the present invention. Therefore, the scope of the present invention should be determined by the claims.

The invention claimed is:

1. A streaming media data processing method, comprising:
    based on a stream index in streaming media data, separating the streaming media data into audio stream data and video stream data and respectively buffering them in an audio stream data queue and a video stream data queue;
    respectively decoding audio data buffered in the audio stream data queue and video data buffered in the video stream data queue;
    based on a play callback timestamp of the decoded audio data and a system time of a streaming media playback equipment, determining an audio/video synchronization time;
    based on a comparison result between a video frame timestamp and a sum of the determined audio/video synchronization time and a video refresh time, processing and displaying each frame in the decoded video stream data according to a predetermined processing method in accordance with the comparison result.

2. The streaming media data processing method according to claim 1, wherein decoding the video data buffered in the video stream data queue further includes:
    when a video frame is determined to be a key data frame or the video frame timestamp is larger than or equal to the sum of the determined audio/video synchronization time and the decoding time of the video frame, decoding the video frame; and
    when the video frame is determined not to be a key data frame or the video frame timestamp is less than the sum of the determined audio/video synchronization time and the decoding time of the video frame, discarding the video frame.

3. The streaming media data processing method according to claim 2, wherein, when the play callback timestamp of the decoded audio data is inconsistent with the system time of the streaming media playback equipment, the audio/video synchronization time is determined to be half of the sum of the callback timestamp and the system time of the streaming media playback equipment.

4. The streaming media data processing method according to claim 2, wherein, based on the comparison result between the video frame timestamp and the sum of the determined audio/video synchronization time and the video refresh time, processing and displaying each frame in the decoded video stream data according to the predetermined processing method in accordance with the comparison result further includes:
    when the video frame timestamp is greater than the sum of the determined audio/video synchronization time and the video refresh time, waiting for displaying the video frame data;
    when the video frame time stamp is equal to the sum of the determined audio/video synchronization time and the video refresh time, displaying the video frame; and
    when the video frame time stamp is less than the sum of the determined audio/video synchronization time and the video refresh time, discarding the video frame.

5. The streaming media data processing method according to claim 2, further comprising:
    before decoding the audio stream data, determining whether a data buffer queue in the audio playing module is fully filled with the audio stream data;
    when the data buffer queue in the audio playing module is fully filled with the audio stream data or all audio stream data is completely decoded, playing the audio steaming data; otherwise,
    continuously decoding the audio stream data buffered in the audio stream data queue.

6. The streaming media data processing method according to claim 1, wherein, when the play callback timestamp of the decoded audio data is inconsistent with the system time of the streaming media playback equipment, the audio/video synchronization time is determined to be half of the sum of the callback timestamp and the system time of the streaming media playback equipment.

7. The streaming media data processing method according to claim 1, wherein, based on the comparison result between the video frame timestamp and the sum of the determined audio/video synchronization time and the video refresh time, processing and displaying each frame in the decoded video stream data according to the predetermined processing method in accordance with the comparison result further includes:
    when the video frame timestamp is greater than the sum of the determined audio/video synchronization time and the video refresh time, waiting for displaying the video frame data;
    when the video frame time stamp is equal to the sum of the determined audio/video synchronization time and the video refresh time, displaying the video frame; and
    when the video frame time stamp is less than the sum of the determined audio/video synchronization time and the video refresh time, discarding the video frame.

8. The streaming media data processing method according to claim 7, wherein, when displaying the video frame, a pointer redirecting technique is used to perform a reference operation directly on a memory storing the video frame.

9. The streaming media data processing method according to claim 1, further comprising:
before decoding the audio stream data, determining whether a data buffer queue in the audio playing module is fully filled with the audio stream data;
when the data buffer queue in the audio playing module is fully filled with the audio stream data or all audio stream data is completely decoded, playing the audio steaming data; otherwise,
continuously decoding the audio stream data buffered in the audio stream data queue.

10. A streaming media data processing apparatus, comprising:
a data separating unit configured to separate the streaming media data into audio stream data and video stream data, based on a stream index in the streaming media data;
a buffering unit configured to respectively buffer the separated audio stream data and video stream data in an audio stream data queue and a video stream data queue;
an audio data decoding unit configured to decode the audio data buffered in the audio stream data queue;
a video data decoding unit configured to decode the video stream data buffered in the video stream data queue;
an audio/video synchronization time determining unit configured to determine an audio/video synchronization time, based on a play callback timestamp of the decoded audio data and a system time of the streaming media playback apparatus; and
a video frame processing unit configured to, based on a comparison result between a video frame timestamp and the sum of the determined audio/video synchronization time and a video refresh time, process and display each frame of the decoded video stream data according to a predetermined processing method in accordance with the comparison result.

11. The streaming media data processing apparatus according to claim 10, wherein, when the play callback timestamp of the decoded audio data is inconsistent with the system time of the streaming media playback apparatus, the audio/video synchronization time determining unit determines that audio/video synchronization time is half of the sum of the play callback timestamp and the system time.

12. The streaming media data processing apparatus according to claim 10, further comprising:
a time determining unit configured to, before decoding the video frame, determine whether the video frame is a key data frame or whether the video frame timestamp is larger than or equal to the sum of the determined audio/video synchronization time and decoding time of the video frame,
wherein:
when the video frame is a key data frame or the video frame timestamp is larger than or equal to the sum of the determined audio/video synchronization time and the decoding time of the video frame, the video data decoding unit decodes the video frame; and
when the video frame is not a key data frame or the video frame timestamp is less than the sum of the determined audio/video synchronization time and the decoding time of the video frame, the video data decoding unit discards the video frame.

13. The streaming media data processing apparatus according to claim 12, wherein, according to the predetermined processing method in accordance with the comparison result, to process and display the video frame further includes:
when the video frame timestamp is greater than the sum of determined audio/video synchronization time and the video refresh time, the video frame processing unit waits for displaying the video frame;
when the video frame timestamp is equal to the sum of determined audio/video synchronization time and the video refresh time, the video frame processing unit displays the video frame; or
when the video frame timestamp is less than the sum of the determined audio/video synchronization time and the video refresh time, the video frame processing unit discards the video frame.

14. The streaming media data processing apparatus according to claim 10, wherein, according to the predetermined processing method in accordance with the comparison result, to process and display the video frame further includes:
when the video frame timestamp is greater than the sum of determined audio/video synchronization time and the video refresh time, the video frame processing unit waits for displaying the video frame;
when the video frame timestamp is equal to the sum of determined audio/video synchronization time and the video refresh time, the video frame processing unit displays the video frame; or
when the video frame timestamp is less than the sum of the determined audio/video synchronization time and the video refresh time, the video frame processing unit discards the video frame.

15. The streaming media data processing apparatus according to claim 14, further comprising:
a memory reference unit configured to, when displaying the video data, use a pointer redirecting technique to perform a reference operation directly on a memory storing the video frame.

16. The streaming media data processing apparatus according to claim 10, further including:
an audio stream data display determining unit configured to, before displaying the audio stream data, determine whether a data buffer queue in an audio playing module has been fully filled with the audio steam data; wherein
when the data buffer queue in the audio playing module has been fully filled with the audio steam data, the audio playing module plays the audio stream data;
otherwise, the audio data decoding unit continuously decodes the audio stream data.

17. A streaming media data playback equipment, comprising a streaming media data processing apparatus according to claim 10.

* * * * *